United States Patent [19]

Arnold

[11] 3,970,936
[45] July 20, 1976

[54] TELECOMMUNICATION USING MUON BEAMS

[75] Inventor: Richard C. Arnold, Chicago, Ill.

[73] Assignee: The United States of America as represented by the United States Energy Research and Development Administration, Washington, D.C.

[22] Filed: May 29, 1973

[21] Appl. No.: 364,397

[52] U.S. Cl............................... 325/26; 250/199; 325/65
[51] Int. Cl.² .......................................... H04B 9/00
[58] Field of Search ............... 250/199; 325/26, 65; 328/227, 228, 233, 234, 235, 236, 237, 238, 256; 332/26, 68

[56] References Cited
UNITED STATES PATENTS

| 34,623 | 3/1862 | Colvin et al. .................. 250/199 |
| 2,790,902 | 4/1957 | Wright............................ 328/256 |
| 2,929,922 | 3/1960 | Schawlow et al. ............. 250/199 |
| 3,412,337 | 11/1968 | Lothrop........................... 328/228 |

OTHER PUBLICATIONS

Swartz, Microstructure of Matter, U.S.A.E.C., 1967.

Primary Examiner—Benedict V. Safourek
Assistant Examiner—Robert Hearn
Attorney, Agent, or Firm—Dean E. Carlson; Arthur A. Churm; Donald P. Reynolds

[57] ABSTRACT

Telecommunication is effected by generating a beam of mu mesons or muons, varying a property of the beam at a modulating rate to generate a modulated beam of muons, and detecting the information in the modulated beam at a remote location.

3 Claims, 5 Drawing Figures

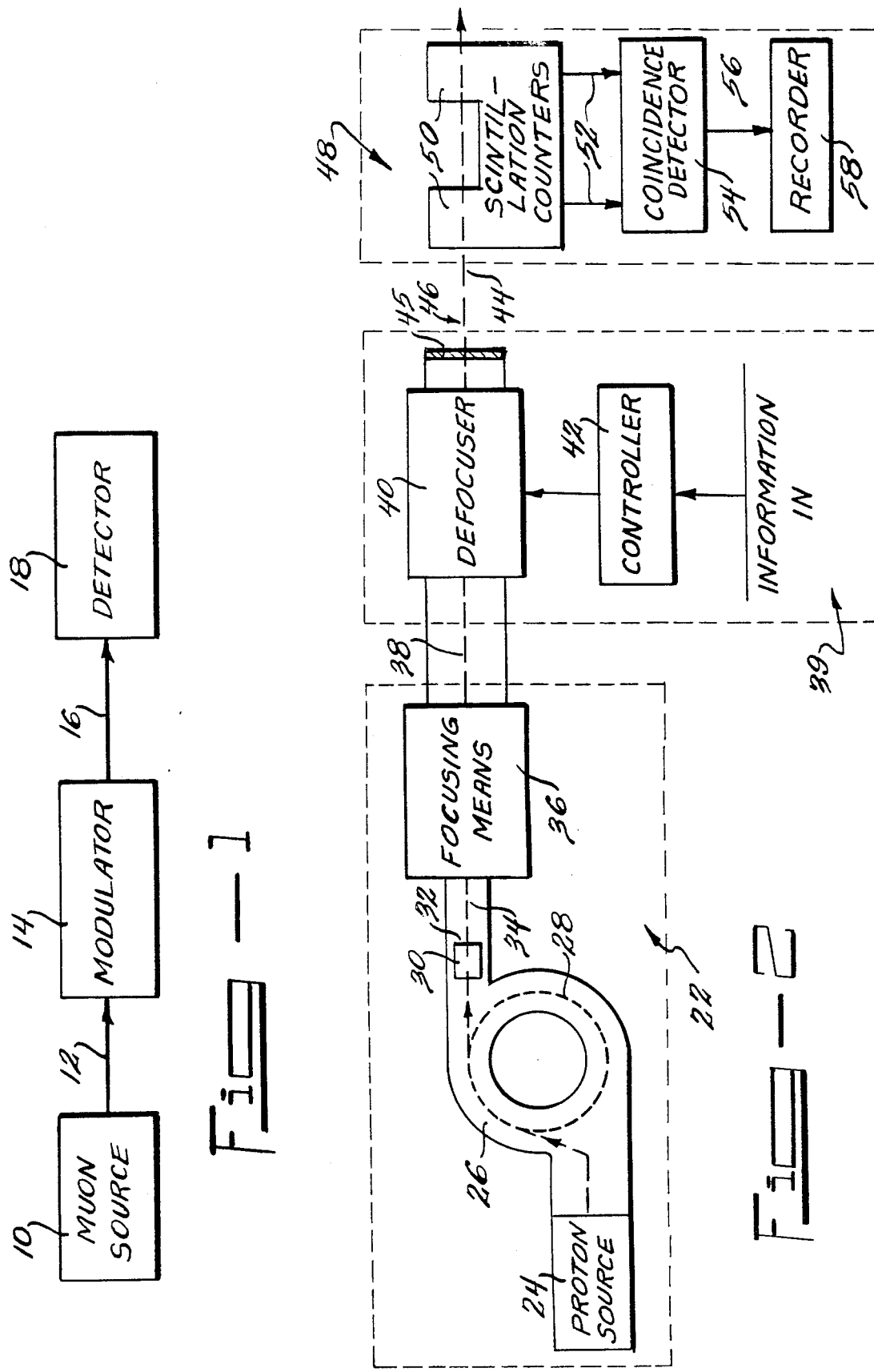

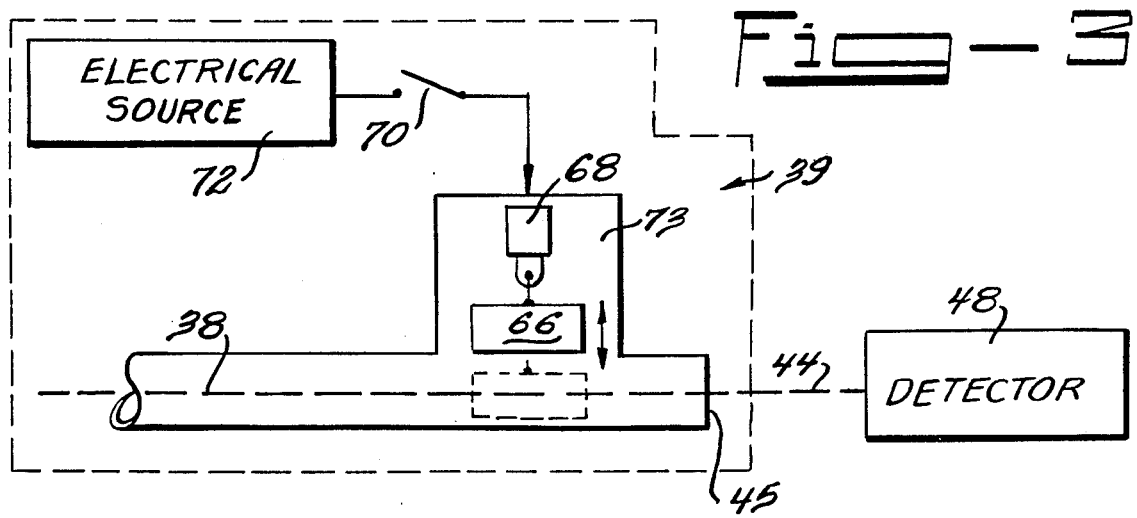
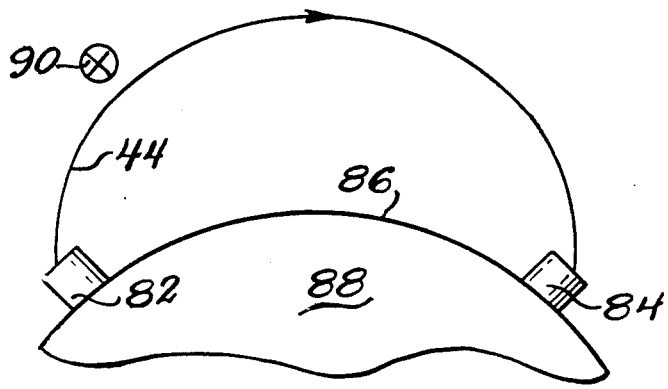
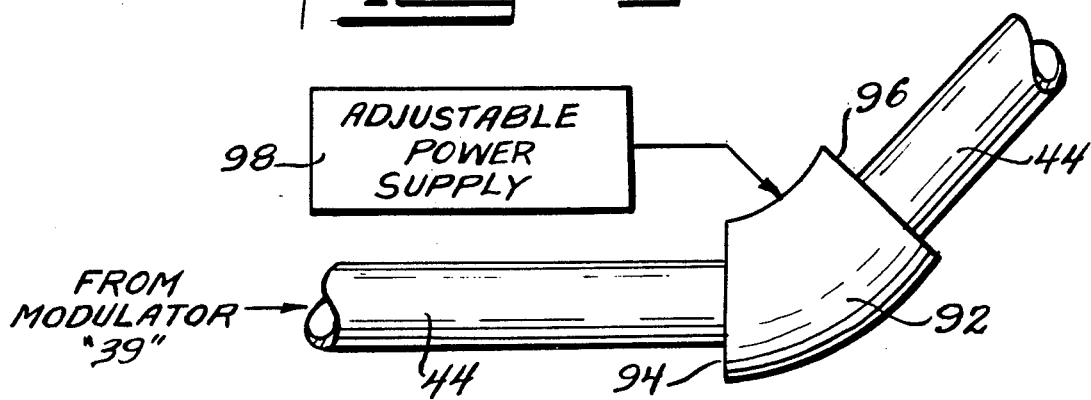

3,970,936

TELECOMMUNICATION USING MUON BEAMS

CONTRACTUAL ORIGIN OF THE INVENTION

The invention described herein was made in the course of, or under, a contract with the United States Atomic Energy Commission.

BACKGROUND OF THE INVENTION

The present invention comprises a method and means of communicating information from one location to another, using muons as the medium of communication.

Substantially all real-time communication over distances greater than those involved in face-to-face conversation is carried out using either electric currents or electromagnetic waves. Means such as telephone, telegraph, radio, and television use wires, coaxial cables, waveguides, and free space to direct or contain the electrical signals carrying messages. It is a characteristic of the modern world that the need for communication facilities seems to expand to fill the availability of such facilities. This characteristic has kept continual pressure upon the designers of communication systems to develop new means of communicating and to use more effectively those already in existence. This pressure is especially evident in viewing the assignments of frequency space for broadcasting. Severe limits are often prescribed there upon power levels, types of modulation, direction of broadcast, and bandwidth used. Means such as single-sideband broadcast and pulse modulation have been developed, in part, to make more effective use of the available bandwidth. Efforts have also continued to extend, to increasingly higher frequencies, the portion of the electromagnetic spectrum that is usable for broadcasting. Further, in some existing communication links, limitation on transmission exists due to interference of solid metallic or other electrically conducting objects in the path of transmission. For example, in microwave transmission, line of sight is required and problems arise in such transmission when solid objects are interposed in the path of transmission.

There are two basic approaches that can be used to provide more communication facilities. One is to make more efficient use of present techniques by extending the usable frequency spectrum and by increasing the efficiency with which the presently available bandwidth is used. The other is to develop new and hitherto unused methods and means of communication.

It is an object of the present invention to provide a new method and means of communication.

It is a further object of the present invention to provide a method and means of telecommunication using muon beams.

It is a further object of the present invention to provide a long-distance communication system that does not use electric currents or electromagnetic waves and that passes through solid obstructions.

It is another object of the present invention to provide a method and means of communication which is less sensitive to solid metallic or other electrically conducting objects in the path of transmission than heretofore.

Other objects will become apparent in the course of a detailed description of the invention.

SUMMARY OF THE INVENTION

Telecommunication or communication at a distance is effected by generating a modulated beam of muons and detecting the modulation of said beam at a remote location. The modulation comprises varying a parameter of the beam to impart information to the beam.

BRIEF DESCRIPTION OF THE DRAWINGS

FIG. 1 is a block diagram of a general embodiment of the present invention.

FIG. 2 is a diagram of a particular apparatus for the practice of the present invention.

FIG. 3 is an expanded view of the modulating device of FIG. 2.

FIG. 4 is a diagram showing locations of sending and receiving stations for the practice of the present invention.

FIG. 5 is a bending device for directing the beam of the present invention.

DETAILED DESCRIPTION OF THE PREFERRED EMBODIMENT

FIG. 1 is a block diagram of a general embodiment of the present invention. In FIG. 1, a source 10 generates a muon beam 12 which is modulated in modulator 14 to cause the variation of some parameter of the muon beam 12, resulting in a modulated beam 16. Detector 18 receives modulated beam 16 at a location remote from source 10 and modulator 14 and extracts the information imparted to muon beam 12 by modulation.

FIG. 2 indicates a particular apparatus for the practice of the present invention. Muon source 22 is a conventional structure which comprises a proton source 24 connected to a particle accelerator 26. Protons are accelerated in particle accelerator 26 along path 28 and are switched to strike metallic target 30, generating beam 32 of negative pi mesons or pions. The pions in beam 32 decay rapidly to mu mesons or muons, producing muon beam 34. Focusing means 36 receives and focuses muon beam 34 into a focused beam 38. Focusing means 36 typically comprises a set of quadrupole magnets, although other means such as electrostatic lenses may also be used.

Focused beam 38 next enters modulator 39, where a variation in focus is imparted in response to an informational signal to be transmitted. In modulator 39, focused beam 38 enters defocuser 40, which is coupled to controller 42 to provide external control thereof. An input of information to controller 42 produces a controlled variation of the properties of defocuser 40. This variation causes a variation in the focus of focused beam 38, producing modulated beam 44, which passes through window 45 and exits from modulator 39. Modulated beam 44 thus contains a variation in focus in response to the informational signal applied to controller 42. Modulated beam 44 is permitted to proceed over path 46 to detector 48, which is at a location remote from muon source 22 and modulator 39.

Detector 48 comprises a pair of scintillation counters 50, each of which generates an output signal 52 in response to the passage therethrough of muons. Output signals 52 are applied to a coincidence detector 54 to guard against false indications, and an output signal 56 from detector 54 is generated whenever both scintillation counters 50 indicate the passage of a muon beam. Recorder 58 receives and displays the output signal 56, which comprises an indication of the presence or absence of modulated beam 44, thus detecting the informational signal imparted to modulated beam 44.

Further understanding of the modulating process may be had from FIG. 3, which is an expanded view of modulator 39 of FIG. 2. In FIG. 3, brass block 66 is disposed adjacent to focused beam 38. Brass block 66 is connected to solenoid 68, which is connected electrically through switch 70 to electrical source 72. Brass block 66 and solenoid 68 are located within modulator housing 73, while switch 70 and electrical source 72 are outside housing 73. When switch 70 is operated, electrical source 72 is connected thereby to energize solenoid 68 and insert brass block 66 into focused beam 38, causing focused beam 38 to be defocused. Switch 70 is operated at an informational rate to impart modulation to focused beam 38 and thereby to transform focused beam 38 into modulated beam 44, which exits from modulator housing 73 through window 45 and travels to remotely located detector 48. The defocusing caused by inserting brass block 66 into focused beam 38 causes muons to be spread over a larger cross-sectional area at detector 48, resulting in a detectable change in muon density at detector 48. Demodulation or detection by detector 48 of the density of modulated beam 44 provides recovery of the information imparted to modulated beam 44 through the operation of switch 70.

The path of modulated beam 44 in FIGS. 2 and 3 may traverse short ranges, essentially line-of-sight paths up to 100 kilometers, and also longer distances up to 1000 kilometers or more. The upper limit on the distance for effective communication is set by the decay distance, which is a function of beam energy, and the ability to focus the beam. The decay distance is the distance at the end of which the number of muons in a beam has decayed to 1/e or 0.368 of its original value. Short-range systems can be constructed to pass through physical barriers. For example, each billion electron volts of energy permits passage of a beam through 0.2 meter of steel. It is thus unnecessary to place a muon communication system so as to have an unobstructed path as is necessary with microwave sending and receiving stations. As the number of obstacles is increased or the line of sight intersects the surface of the earth, it is preferred that the longrange method of communication be used, as indicated in FIG. 4. In FIG. 4, a sending station 82 and a receiving station 84 are shown at different locations on the surface 86 of the earth 88. Magnetic flux line 90 is a typical flux line of the earth's magnetic field. Stations 82 and 84 are placed relative to each other and the modulated beam 44 of FIGS. 2 and 3 is directed so that the magnetic Lorentz force on modulated beam 44 resulting from interaction of moving charged particles in beam 44 and the magnetic field of the earth causes modulated beam 44 to bend around the curvature of the earth to reach station 84 from station 82. The magnetic Lorentz force is in a direction perpendicular to both the direction of motion of the muon beam and the line of magnetic flux. This force is obtained in magnitude and direction by taking the vector cross product $qv \times B$, where $q$ is the charge on a muon, $v$ is the vector velocity of the muon, and B is the vector magnetic flux density.

For a given location of stations and a given range of muon energies, a parameter available in establishing a linking path between stations such as the path of muon beam 44 is the direction of the beam leaving sending station 82. FIG. 5 shows an apparatus for obtaining a desired direction of a beam. In FIG. 5, modulated beam 44 from modulator 39 enters a conventional bending magnet 92 at entrance 94. Magnetic fields generated inside bending magnet 92 interact with charged muons in modulated beam 44 to produce a magnetic Lorentz force which acts to bend modulated beam 44 into a different direction of propagation at exit 96 of bending magnet 92. Adjustable power supply 98 can be set to vary the magnitude of the magnetic field of bending magnet 92 to adjust the amount of bending so that modulated beam 44 is directed along a desired path to effect communication between stations 82 and 84 of FIG. 4.

Muons are leptons which undergo weak but not strong nuclear interactions, and also undergo electromagnetic interactions. Their rest mass is approximately 207 times that of an electron, the only other charged particle that undergoes weak and also electromagnetic interaction. A beam of high-energy muons thus penetrates matter with relatively small losses, yet is capable of actuating a detector that response to electromagnetic interactions. A muon decays with a half-life of 1.5 microseconds to produce an electron, a muon neutrino, and an electron antineutrino. The half-life, however, is measured in the time frame of the muon. In laboratory coordinates, the time-dilated lifetime of muons results in the decay distance, which varies approximately as a linear function of muon energy at high energies of the order of 1 GeV or higher. For example, a muon energy of 5 GeV produces a decay-path length of 35 kilometers, while muons at 100 GeV decay over a path of 700 kilometers. These energy levels have been achieved in existing particle accelerators.

Equipment that is presently available is readily capable of generating beams of muons with angular divergences of 1 milliradian. With such a beam a square Cherenkov detector 10 meters on a side can intercept substantially all of the beam at a distance of 10 kilometers. The decay of muons in such a short-range system is not a problem, since the decay distance is a function of muon energy. It is preferable for effective communication to have a decay distance that is as long as possible compared to the desired communication distance. In any event, communication will be possible over a path as long as a few decay lengths.

Communication using muon beams has been demonstrated at the Argonne National Laboratory, using a beam of negative pions at 3.5 GeV. The pions decayed into muons, which were focused in a system of quadrupole magnets and directed approximately 100 meters to two scintillation counters that were 30 cm square. The counters were operated in coincidence, and a coincidence signal proportional to beam density was displayed on a strip-chart recorder. Density modulation was achieved by inserting into the beam a brass block 7.5 cm in length having a cross-sectional area larger than the beam. Insertion of the block defocused the beam, reducing beam density at the detector. A message was sent by inserting and withdrawing the brass block to generate an interrupted c-w signal of muon density in Morse code. This message was received and read at the strip-chart recorder. Obstacles in the path of the muon beam included a concrete shield 1.5 meters in thickness, a house trailer containing a computer, and a steel-framed building.

It should be understood that the embodiment described herein is but one of many variations of details within the scope of the invention. For example, it is possible to vary parameters other than the focus of focused beam 38. Parameters subject to modulation include beam density, beam velocity, beam direction, polarization, and departure time of individual muons. The same type of modulation used to convey information on electromagnetic waves or electric currents can be used to modulate muon beams. These include interrupted c-w modulation, amplitude modulation, pulse-code modulation, pulse-position modulation, and other types of modulation well known in the communication field. Similarly, detector 48 of FIG. 2 may comprise scintillation counters, as illustrated, Cherenkov counters, wire chambers, or any of various well-known detectors of beams of charged particles or of the passage of individual particles.

Persons skilled in the art will be enabled by this disclosure to apply the teachings of this invention to accomplish its objects in varied ways. The scope of the protection accorded this invention should therefore be limited only in accordance with the appended claims.

The embodiments of the invention in which an exclusive property or privilege is claimed are defined as follows:

1. A method of telecommunication comprising the steps of:
   a. generating a beam of protons;
   b. impinging said beam of protons on a target to generate a beam of pi mesons;
   c. permitting said beam of pi mesons to decay into a beam of muons;
   d. defocusing said beam of muons at a modulating rate to generate a modulated beam of muons at a first location;
   e. transmitting said modulated beam;
   f. receiving said modulated beam at a second location; and
   g. detecting the modulation in said modulated beam, whereby telecommunication is effected between said two locations.

2. An apparatus for communicating a modulating signal comprising:
   a. means for generating a beam of muons;
   b. a solid block;
   c. means responsive to said modulating signal for inserting said solid block into said beam to produce a modulated beam of muons; and
   d. means disposed remotely from said generating and inserting means and accepting said modulated beam to detect the modulation of said modulated beam of muons,
whereby said modulating signal is communicated.

3. An apparatus for communicating a signal comprising:
   a. a proton synchrotron generating a beam of muons;
   b. a solenoid assembly;
   c. a solid block coupled to said solenoid assembly and positioned and adapted to be inserted thereby into said beam of muons to defocus said beam and vary the density of said beam at an informational rate;
   d. a scintillation counter disposed in said defocused beam of muons at a location remote from said synchrotron, solenoid assembly, and solid block, said scintillation counter accepting said beam of muons at said remote location to detect the density of said beam; and
   e. a recorder connected electrically to said scintillation counter to record the detected density of said beam.

* * * * *